No. 830,470. PATENTED SEPT. 4, 1906.
G. WEBSTER.
DEHORNER.
APPLICATION FILED DEC. 8, 1904.
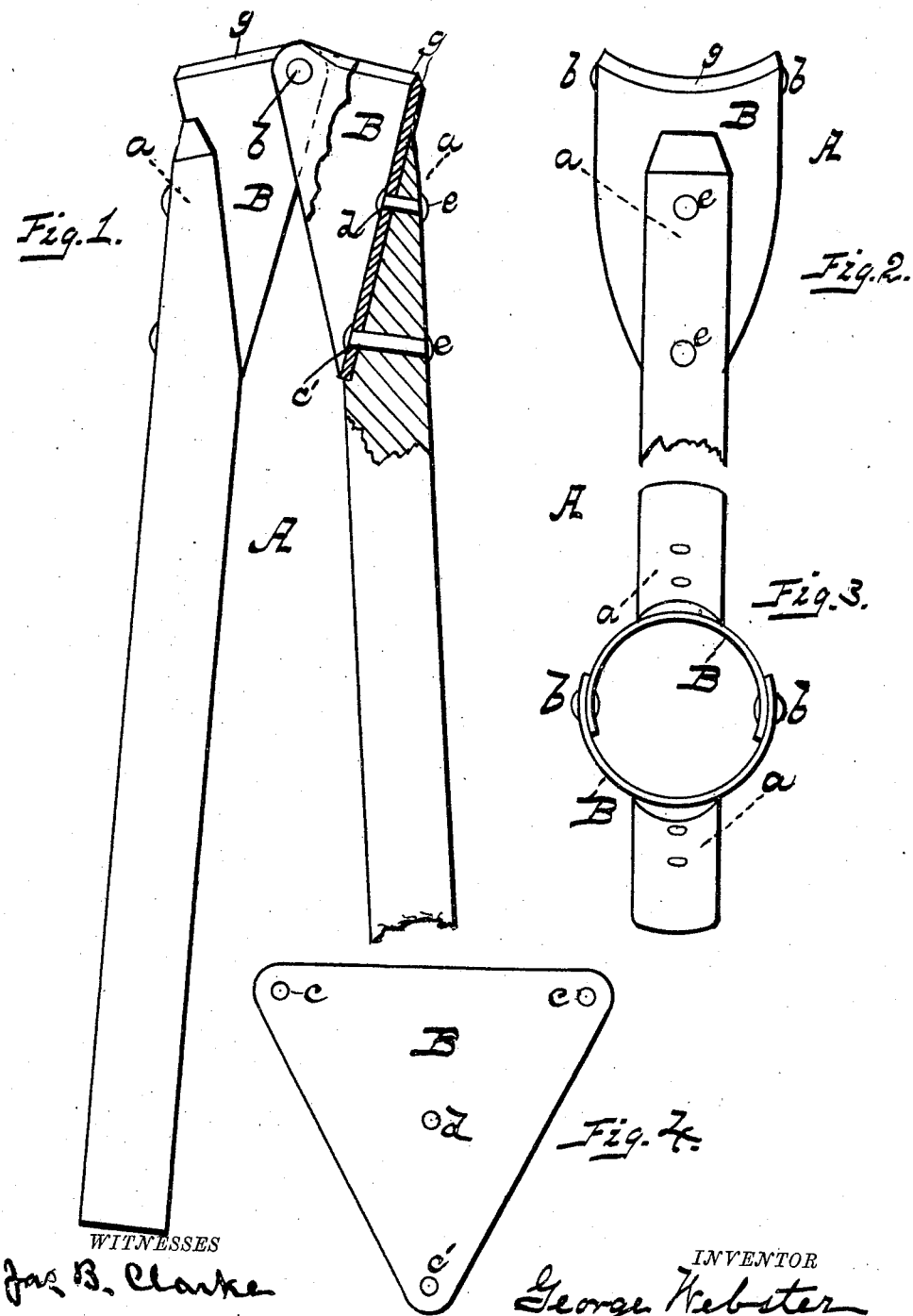

UNITED STATES PATENT OFFICE.

GEORGE WEBSTER, OF CHRISTIANA, PENNSYLVANIA, ASSIGNOR TO WILL C. BARNES, OF DORSEY, TERRITORY OF NEW MEXICO.

DEHORNER.

No. 830,470.     Specification of Letters Patent.     Patented Sept. 4, 1906.

Application filed December 8, 1904. Serial No. 236,058.

*To all whom it may concern:*

Be it known that I, GEORGE WEBSTER, a citizen of the United States, residing at Christiana, in the county of Lancaster and State of Pennsylvania, have invented new and useful Improvements in Dehorners, of which the following is a specification.

The object of my invention is to provide an improved dehorning implement for removing the horns of young cattle or calves; and the invention consists of an improved construction of an implement of this character which may be cheaply manufactured and yet durable in construction and be made to operate and amputate the horn well down within the base of the same.

For a full description of the invention and the merits thereof and also to acquire a knowledge of the details of construction of the means for effecting the result reference is to be had to the following description and accompanying drawings, in which—

Figure 1 is a side elevation of my improved dehorning implement with parts in section. Fig. 2 is a side elevation at right angles to Fig. 1 and with the handles broken away. Fig. 3 is an end view. Fig. 4 is a detail view illustrating the blank or initial flat form of the blades.

Corresponding and like parts are referred to in the following description and indicated in all the views of the drawings by the same reference characters.

Referring to the drawings, the letter A designates my improved dehorning implement, which, broadly speaking, comprises the two pivotally-connected cutting-blades B, to each of which is secured a handle $a$. As shown in Fig. 4, each of the cutting-blades is formed of a blank of sheet metal of triangular shape, in each corner of which there is provided perforations (designated $c$ and $c'$) and about the center of each there is formed another perforation $d$. One edge of the triangular blank shown in Fig. 4 is beveled, as shown at $g$ in Figs. 1 and 2, to produce a cutting edge. Each blade is formed by curving the blank shown in Fig. 4 substantially on a line through the perforations $c'$ and $d$, so that the two corners containing the perforations $c$ will be bent toward each other, so as to bring their perforations in line with each other. Each blade having been thus curved, the ends of the two are overlapped, as illustrated best in Figs. 1 and 3, and pivots $b$ are inserted through the registering perforations or apertures $c$ to pivotally connect said blades with the cutting edges $g$ outermost. The handles $a$ are secured in a detachable manner to the outer sides of the blades by fastenings $e$ passing therethrough and through the apertures $c'$ and $d$, as best seen in Fig. 1.

One of the essential features of the invention resides in the peculiar means employed for connecting the handles to the cutting-blades, whereby a construction is obtained which meets the combined requirements of cheapness and rigidity. It will be observed that one end of each of the handles is beveled and that the beveled portion is applied to the blade on a medial line passing through the angle opposite the cutting edge. Detachable fastening means are employed for connecting the handles to the blades, so that either of the members can be readily replaced when necessary. Owing to the fact that the ends of the handles are beveled, the handles are caused to flare outwardly and to assume a convenient position for operation when the implement is applied to the horn of an animal. By bending the blades as heretofore described the double result is accomplished of causing the cutting edges to lie in the arc of a circle, which is the most effective position for the work required, and also of forming side flanges which act in a manner similar to the flanges on channel-iron to reinforce the blades against transverse bending strain.

In the practical operation of the dehorning implement embodying my invention the dehorner is placed upon the horn of the animal with the horn passing through the opening formed by the two cutting edges of the blades, and when the blades have been pressed down upon them firmly at the base of the horn the two handles are forced downward, thereby bringing the cutting edges together with a shearing action and providing a draw cut therefor, thereby insuring that the horn shall be quickly and cleanly amputated.

Having thus described the invention, what is claimed as new is—

As a new article of manufacture, a dehorning implement comprising equilateral triangular sheet-metal blades, each of which is provided with a central opening, and also with an opening in each corner, one of the edges of each blade being sharpened, and the said blades being bent or curved so as to cause the sharpened edge to lie approximately in the arc of a circle and also form side flanges which reinforce the blades against transverse bending strain, the corresponding side flanges of the two blades overlapping each other to cause the openings in the corners to register, pivot-fastenings passing through the registering openings, handles having one end thereof beveled, the beveled portion being applied to the blades on a medial line passing through the corner opposite the sharpened edge, and detachable fastening members for securing the handles to the blades, the said detachable fastening members passing respectively through the central opening in the plates and the opening in the corner opposite the sharpened edge.

In testimony whereof I affix my signature in presence of two subscribing witnesses.

GEORGE WEBSTER.

Witnesses:
   WM. E. DONOGHUE,
   J. A. HARRAR.